(12) United States Patent  (10) Patent No.: US 7,616,213 B2
Chuter  (45) Date of Patent: *Nov. 10, 2009

(54) SYSTEM AND METHOD FOR REAL-TIME CO-RENDERING OF MULTIPLE ATTRIBUTES

(75) Inventor: Christopher John Chuter, Austin, TX (US)

(73) Assignee: Landmark Graphics Corporation, a Halliburton Company, Houston, TX (US)

( * ) Notice: Subject to any disclaimer, the term of this patent is extended or adjusted under 35 U.S.C. 154(b) by 16 days.

This patent is subject to a terminal disclaimer.

(21) Appl. No.: 11/904,141

(22) Filed: Sep. 26, 2007

(65) Prior Publication Data

US 2008/0024512 A1 Jan. 31, 2008

Related U.S. Application Data

(63) Continuation of application No. 10/628,781, filed on Jul. 28, 2003, now Pat. No. 7,298,376.

(51) Int. Cl.
G09G 5/00 (2006.01)
(52) U.S. Cl. .................. 345/584; 345/424; 345/426; 345/428; 345/612; 345/644; 382/108; 382/109; 382/195; 382/206
(58) Field of Classification Search ............... 345/584, 345/612, 644; 382/109
See application file for complete search history.

(56) References Cited

U.S. PATENT DOCUMENTS

| 4,359,766 A | 11/1982 | Waters et al. |
|---|---|---|
| 4,467,461 A | 8/1984 | Rice |
| 5,056,066 A | 10/1991 | Howard |
| 5,148,494 A | 9/1992 | Keskes |
| 5,432,751 A | 7/1995 | Hildebrand |
| 5,734,384 A | 3/1998 | Yanof |
| 5,781,194 A | 7/1998 | Ponomarev et al. |
| 5,838,564 A | 11/1998 | Bahorich |
| 5,892,732 A | 4/1999 | Gereztenkom |
| 5,949,424 A | 9/1999 | Cabral et al. |

(Continued)

FOREIGN PATENT DOCUMENTS

WO WO/00/14574 IB A1 3/2000

(Continued)

OTHER PUBLICATIONS

The Open GL Shading Language; 2.1 Introduction to the OpenGL Shading Language; 2.2 Why Write Shaders?; 2.3 OpenGL Programmable Processors; Chapter 2; pp. 33-36, Jan. 25, 2006.

(Continued)

*Primary Examiner*—Antonio A Caschera
(74) *Attorney, Agent, or Firm*—Crain Caton & James

(57) ABSTRACT

Systems and methods for enhancing the combined image of multiple attributes without comprising the image of either attribute. The combined image of the multiple attributes is enhanced for analyzing a predetermined property revealed by the attributes. The combined image can be interactively manipulated to display each attribute relative to an imaginary light source or highlighted using a specular component. The systems and methods are best described as particularly useful for analytical, diagnostic and interpretive purposes.

45 Claims, 5 Drawing Sheets
(3 of 5 Drawing Sheet(s) Filed in Color)

U.S. PATENT DOCUMENTS

| | | | |
|---|---|---|---|
| 6,049,759 | A | 4/2000 | Etgen |
| 6,078,869 | A | 6/2000 | Gunasekera |
| 6,396,495 | B1 | 5/2002 | Parghi et al. |
| 6,424,464 | B1 | 7/2002 | Neff et al. |
| 6,473,696 | B1 | 10/2002 | Onyla et al. |
| RE38,229 | E | 8/2003 | Marfurt et al. |
| 6,690,820 | B2 | 2/2004 | Lees et al. |
| 6,765,570 | B1 | 7/2004 | Cheung et al. |
| 6,594,585 | B1 | 5/2005 | Gereztenkom |
| 6,940,507 | B2 | 9/2005 | Repin et al. |
| 7,006,085 | B1 | 2/2006 | Acosta et al. |
| 7,013,218 | B2 | 3/2006 | Baker, III et al. |
| 7,076,735 | B2 | 7/2006 | Callegari |
| 7,102,647 | B2 | 9/2006 | Sloan et al. |
| 7,218,331 | B2 | 5/2007 | Huang et al. |
| 7,298,376 | B2 * | 11/2007 | Chuter ...................... 345/584 |
| 2002/0172401 | A1 | 11/2002 | Lees et al. |
| 2003/0025692 | A1 | 2/2003 | Lu et al. |
| 2004/0081353 | A1 | 4/2004 | Lees et al. |
| 2004/0227772 | A1 | 11/2004 | Huang et al. |
| 2005/0237334 | A1 | 10/2005 | Chuter |
| 2006/0206562 | A1 | 9/2006 | Callegari |

FOREIGN PATENT DOCUMENTS

WO     WO/02/29445 IB A1     4/2002

OTHER PUBLICATIONS

Computer Graphics: Principles and Practice; Image Manipulation and Storage; Second Edition; p. 838, Jan. 1, 1990.

Mark J. Kilgard; A Practical and Robust Bump-mapping Technique for Today's GPUs; GDC 2000: Advanced OpenGL Game Development; Jul. 5, 2000; pp. 1-39; NVIDIA Corporation; Santa Clara, California.

Lees Jack A.; Constructing Faults From Seed Picks by Voxel Tracking; The Leading Edge; Mar. 1999; pp. 338-340; Texaco Visualization Geophysical Team; Houston, Texas.

Bajaj, et al., "Fast Isocontouring for Improved Interactivity", Proc. ACM SIGGRAPH/IEEE Symposium on Volume Visualization (ACM Press, 1996), pp. 39-46.

IRIS Universe No. 36 Silicon Graphics Inc., Summer 1996 96 pages.

Yilmaz, OZ, and Lucas, Darran; Prestack Layer Replacement; Geophysics 51(7); Jul. 1986; pp. 1355-1369; vol. 51, No. 7; USA.

Texaco E&P Center Allows Visual Probe of 3D Data Volumes, Oil & Gas Journal, Jun. 1, 1998, pp. 46-47, copied as one page.

"VoxelGeo Consortium Meeting Summary," CogniSeis Development, Jun. 13, 1996, 2 pages.

Ching-Rong Lin, R. Bowen Loftin, and H. Roice Nelson, Jr., Interaction with Geoscience Data in an Immersive Environment, Virtual Reality, 2000, pp. 55-62.

Ching-Rong Lin and R. Bowen Loftin, Application of Virtual Reality in the Interpretation of Geoscience Data, Proceedings of the ACM Symposium on Virtual Reality Software and Technology, 1998, 8 pgs.

VoxelGeo, Paradigm Geophysical Broadband Solutions in Depth, Mar. 27, 1998, 5 pages, printed from Cogniseis website www.cogniseis.com/voxelgeo.htm.

Holden, Paul, VoxelGeo 1.1.1: Productivity Tool for the Geosciences, Release Notes (1994) & User's Guide (Rev. Mar. 1994), Vital Images, Inc., pp. 1-461.

"Computing", Mechanical Engineering Magazine, Oct. 1996, 8pgs. The American Society of Mechanical Engineers.

Lacroute, "Fast Volume Rendering Using a Shear-Warp Factorization of the Viewing Transformation", Doctoral dissertation submitted to Departments of Electrical Engineering and Computer Science Stanford University, Sep. 1995, 236 pgs.,Stanford University Stanford, CA, USA.

Neider, Jackie, Davis, Tom, and Woo, Mason; OpenGL Programming Guide; 1994; pp. 422-427; 3rd Edition; Multitexturing; Silicon Graphics, Inc.; Addison-Wesley Professional.

"Does Your 3D Interpretation Software Move as Fast as You Do? Geoprobe Does." Sept. 1999, Brochure, published by Magic Earth, 2 pages, US.

Ney, Fishman, "Editing Tools for 3D Medical Imaging," IEEE Computer Graphics & Applications, Nov. 1991, pp. 63-71, vol. 11 issue 6, IEEE Computer Society Press, Los Alamitos, CA, U.S.A.

Durkin, Hughes, "Nonpolygonal Isosurface Rendering for Large Volume Datasets", "Proceedings of the conference on Visualization '94", 1994, p. 293-300, IEEE Computer Society Press, Los Alamitos, CA, U.S.A.

Lorensen, Cline, "Marching Cubes: A High Resolution 3D Surface Construction Algorithm," Computer Graphics, vol. 21 issue 4, Jul. 1987, pp. 163-169, Association for Computing Machinery, New York, U.S.A.

Speray, Kennon, "Volume Probes: Interactive data Exploration on Arbitrary Grids" Computer Graphics, vol. 24 issue 5, Nov. 1990, pp. 5-12, Association for Computing Machinery, New York, U.S.A.

Manssour, Isabel H., Furuie, Sergio S. Olabarriage, Silvia D., and Freitas, Carla M.D.S.; Visualizing Inner Structures in Multimodel Volume Data; XV Brazilian Symposium on Computer Graphics and Image Processing (SIBGRAPI'02); 2002; pp. 51-59.

Mark, William R. Glanville, R. Steven, Akeley, Kurt, and Kilgard, Mark J.; Cg: A System for Programming Graphics Hardware in a C-like Language; Siggraph 2003; pp. 896-907, 12 pages.

Christie, Murray; Thinking Inside the Box; CSEG Recorder; Jun. 2002; pp. 50-57.

James, Huw, Peloso, Andy and Wang, Joanne; Volume Interpretation of Multi-Attribute 3D Surveys; First Break; Mar. 2002, pp. 176-179; vol. 20:3; Eage.

Cai, Wenli and Sakas, Georgios, Data Intermixing and Multi-Volume Rendering; Eurographics '99; 1999; pp. 359-368; vol. 18, No. 3; Blackwell Publishers, Oxford, UK and Malden, MA.

Brown, Alistair R., "Interpretation of Three-Dimensional Seismic Data"; AAPG Memoir 42; Dec. 1999 pp. 19, 233, 5th Edition; American Association of Petroleum Geologists.

Oldenzeil, T.; Dithuijzen, Roos Van & Kruijsdijk, Cor Van; Geologic Parameterization of Reservoir Model Enhances History-Match Procedure; The Leading Edge; Jun. 2002; pp. 544-551; vol. 21, No. 6, Even Pages Only.

Levin, Stewart A.; Resolution in Seismic Imaging: Is it all a Matter of Perspective?; Geophysics 63(2); Mar.-Apr. 1998; pp. 743-749; vol. 63, No. 2; USA.

Sheriff, R.E.; Encyclopedic Dictionary of Applied Geophysics; http://scitation.aip.org/journals/doc/SEGLIB-home/segLogin.jsp; 2002; 1 page; 4th Ed.; Society of Exploration Geophysicists; Tulsa, Oklahoma.

Tanner, M. Turhan, Ernest E. and Neidell, Norman S.; Paleo Seismic and Color Acoustic Impedence Sections; Applications of Downward Continuation in Structural and Stratigraphic Context; 1982; pp. 110-111; Expanded Abstract S8.7, 52nd Annual Meeting of The Society of Exploration Geophysicists; Dallas, Texas.

Lin, Ching-Rong, Loftin, R. Bowen & Stark, Tracy: Virtual Reality for Geosciences Visualization: Computer Human Interaction; 1998; Proceedings, 3rd Asia Pacific Shonan Village Center; Japan; Jul. 15-17, 1998; pp. 196-201; IEEE Comput. Soc, US. Las Alamitos, CA.

Pommert, Andreas, Hohne, Karl Heinz, Pflesser, Bernhard, Riemer, Martin, Schiemann, Thomas, Schubert, Rainer, Tiede, ULF & Schumacher, UDO; A Highly Realistic Volume Model Derived From the Visible Human Male; The Third Visible Human Project Conference, Bethesda, Maryland; Oct. 2000; 11 pages.

Schwab, Matthias; Enhancement of Discontinuities in Seismic 3-D Images Using a Java Estimation Library; Ph.D Thesis/Stanford University/Department of Geophysics, Jun. 2001; 164 Pages.

Cortesi, "React Real Time Programmer's Guide", Mar. 18, 1997, 187 pages, Silicon Graphics Inc., California, U.S.A.

Pfister, Kaufman, "Cube 4—A Scalable Architecture for Real-Time Volume Rendering," Proceedings 1996 IEEE Symposium on Volume Visualization, Oct. 28-29, 1996, pp. 47-54, 100.

Serra, et al., "Interactive Vessel Tracing in Volume Data", 1997, pp. 131-137"Symposium on 3D Grapics", Providence, RI.

Cabral, et al., "Accelerated Volume Rendering and Tomographic Reconstruction Using Texture Mapping Hardware", 1995, p. 91-97, Association for Computing Machinery, New York, U.S.A.

Cullip Timothy and Neumann Ulrich, "Accelerating Volume Reconstruction with 3D Texture Hardware", 1993, 6 pages, University of North Carolina, Chapel Hill, U.S.A.

Cignoni, Montani, Scopigno, "MagicSphere: an insight tool for 3D data visualization," 1994, p. 317-328, vol. 13(3), Computer Graphics Forum, The Eurographics Association and Blackwell Publishing Ltd. Oxford, U.K.

Yagel Roni, "The Flipping Cube: A Device for Rotating 3D Rasters", "Advances in Computer Graphics Hardware (Machines)", 1991, p. 86-99.

Höllerer, Hege, Stallings, "Visualization and 3D-Interaction for Hyperthermia Treatment Planning," 1995, 7 pgs., Proceedings, 9th International Symposium on Computer Assisted Radiology, CH Volume Visualization Workshop, Berlin, Germany.

Levoy Marc, "Design for a Real-Time High-Quality Volume Rendering Workstation", Proceedings of the Chapel Hill Workshop on Volume Visualization., 1989, p. 85-92, Association for Computing Machinery, New York, U.S.A.

Kanus, et al, "Implimentations of Cube-4 on the Teramac Custom Computing Machine", "Computers and Graphics", 1997, p. 199-208, vol. 21, Elsevier, London, U.K.

Kaufman, Bakalash "Memory and Processing Architecture for 3D Voxel-Based Imagery," "IEEE Computer Graphics and Applications", Nov.-Dec. 1988, pp. 10-23, vol. 8 No. 6, IEEE Computer Society, Washington D.C., U.S.A.

Brady, et al, "Crumbs: a virtual environment tracking tool for biological imaging," IEEE Symposium on Frontiers in Biomedical Visualization, 1995, p. 18, IEEE Computer Society, Washington DC, U.S.A.

Fraser Robert, "Interactive Volume Rendering Using Advanced Gaphics Architectures," 1994, Silicon Graphics Inc.; 8 pages.

Kulic, "Building an OpenGL Volume Renderer" "SGI Development News", 1996; 9 pages.

Landmark Graphics Corporation, Operational manual on "Seiscube," Oct. 1996, pp. 1-272.

Landmark Graphics Corporation, Operational manual on "OpenVision," Jul. 1997, pp. 1-169.

Landmark Graphics, User Documentation, Faults (Displaying Faults and Using Seismic Planes with Animation and Frame Control), EarthCube, 2002, pp. 11-15, 53-55.

Landmark Graphics, User Documentation, Seismic (Overview & Seismic Display and Navigation), EarthCube, 2002, pp. 1,65-115.

Landmark Graphics, User Documentation, Setup (Faults & Selecting an Object), EarthCube, 2002, pp. 13-20, 93-99.

Cogniseis, "VoxelGeo version 2.2 Product Definition version 14", May 1996, 27 pages, Houston, Texas.

VoxelGeo User's Manual 2.1.5, Oct. 1996, 213 pages, Cogniseis Development, Inc., Houston, Texas.

* cited by examiner

SYSTEM AND METHOD FOR REAL-TIME CO-RENDERING OF MULTIPLE ATTRIBUTES

CROSS-REFERENCE TO RELATED APPLICATIONS

This application is a continuation of U.S. application Ser. No. 10/628,781 filed on Jul. 28, 2003, which is hereby incorporated by reference. Applicant therefore, claims priority based on the filing date of U.S. application Ser. No. 10/628,781.

STATEMENT REGARDING FEDERALLY SPONSORED RESEARCH OR DEVELOPMENT

Not Applicable.

BACKGROUND OF THE INVENTION

1. Field of the Invention

The present invention relates to a visualization technique for co-rendering multiple attributes in real time, thus forming a combined image of the attributes. The combined image is visually intuitive in that it distinguishes certain features of an object that are substantially indistinguishable in their natural environment.

2. Related Art

In the applied sciences, various fields of study require the analysis of two-dimensional (2-D) or three-dimensional (3-D) volume data sets wherein each data set may have multiple attributes representing different physical properties. An attribute, sometimes referred to as a data value, represents a particular physical property of an object within a defined 2-D or 3-D space. A data value may, for instance, be an 8-byte data word which includes 256 possible values. The location of an attribute is represented by (x, y, data value) or (x, y, z, data value). If the attribute represents pressure at a particular location, then the attribute location may be expressed as (x, y, z, pressure).

In the medical field, a computerized axial topography (CAT) scanner or magnetic resonance imaging (MRI) device is used to produce a picture or diagnostic image of some specific area of a person's body, typically representing the coordinate and a determined attribute. Normally, each attribute within a predetermined location must be imaged separate and apart from another attribute. For example, one attribute representing temperature at a predetermined location is typically imaged separate from another attribute representing pressure at the same location. Thus, the diagnosis of a particular condition based upon these attributes is limited by the ability to display a single attribute at a predetermined location.

In the field of earth sciences, seismic sounding is used for exploring the subterranean geology of an earth formation. An underground explosion excites seismic waves, similar to low-frequency sound waves that travel below the surface of the earth and are detected by seismographs. The seismographs record the time or arrival of seismic waves, both direct and reflected waves. Knowing the time and place of the explosion, the time of travel of the waves through the interior can be calculated and used to measure the velocity of the waves in the interior. A similar technique can be used for offshore oil and gas exploration. In offshore exploration, a ship tows a sound source and underwater hydrophones. Low frequency (e.g., 50 Hz) sound waves are generated by, for example, a pneumatic device that works like a balloon burst. The sounds bounce off rock layers below the sea floor and are picked up by the hydrophones. In either application, subsurface sedimentary structures that trap oil, such as faults and domes are mapped by the reflective waves.

The data is collected and processed to produce 3-D volume data sets. A 3-D volume set is made up of "voxels" or volume elements having x, y, z coordinates. Each voxel represents a numeric data value (attribute) associated with some measured or calculated physical property at a particular location. Examples of geological data values include amplitude, phase, frequency, and semblance. Different data values are stored in different 3-D volume data sets, wherein each 3-D volume data set represents a different data value. In order to analyze certain geological structures referred to as "events" information from different 3-D volume data sets must be separately imaged in order to analyze the event.

Certain techniques have been developed in this field for imaging multiple 3-D volume data sets in a single display, however, not without considerable limitations. One example includes the technique published n *The Leading Edge* called "Constructing Faults from Seed Picks by Voxel Tracking" by Jack Lees. This technique combines two 3-D volume data sets in a single display, thereby restricting each original 256-value attribute to 128 values of the full 256-value range. The resolution of the display is, therefore, significantly reduced, thereby limiting the ability to distinguish certain events or features from the rest of the data. Another conventional method combines the display of two 3-D volume data sets, containing two different attributes, by making some data values more transparent than others. This technique becomes untenable when more than two attributes are combined.

Another technique used to combine two different 3-D volume data sets in the same image is illustrated in U.S. patent application Ser. No. 09/936,780, assigned to Magic Earth, inc. and incorporated herein by reference. This application describes a technique for combining a first 3-D volume data set representing a first attribute and a second 3-D volume data set representing a second attribute in a single enhanced 3-D volume data set by comparing each of the first and second attribute data values with a preselected data value range or criteria. For each data vale where the criteria are met, a first selected data value is inserted at a position corresponding with the respective data value in the enhanced 3-D volume data set. For each data value where the criteria are not met, a second selected data value is inserted at a position corresponding with the respective data value in the enhanced 3-D volume data set. The first selected data value may be related to the first attribute and the second selected data value may be related to the second attribute. The resulting image is an enhanced 3-D volume data set comprising a combination or hybrid of the original first 3-D volume data set and the second 3-D volume data set. As a result, the extra processing step needed to generate the enhanced 3-D volume data set causes interpretation delays and performance slow downs. Furthermore, this pre-processing technique is compromised by a "lossy" effect which compromises data from one seismic attribute in order to image another seismic attribute. Consequently, there is a significant loss of data visualization.

In non-scientific applications, techniques have been developed to define surface details (texture) on inanimate objects through lighting and/or shading techniques. For example, in the video or computer graphics field, one technique commonly used is texture mapping. Texture typically refers to bumps, wrinkles, grooves or other irregularities on surfaces. Textured surfaces are recognized by the way light interacts with the surface irregularities. In effect, these irregularities are part of the complete geometric form of the object although they are relatively small compared to the size and form of the object. Conventional texture mapping techniques have been known to lack the necessary surface detail to accomplish what is conventionally meant by texture. In other words, conventional texture mapping techniques provide objects with a colorful yet flat appearance. To this end, texture mapping was expanded to overcome this problem with what is now commonly referred to as a bump mapping.

Bump mapping is explained in an article written by Mark Kilgard called "A Practical and Robust Bump Mapping Technique for Today's GPU's" (hereinafter Kilgard) which is incorporated herein by reference. In this article, bump mapping is described as "a texture-based rendering approach for simulating lighting effects caused by pattern irregularities on otherwise smooth surfaces." Kilgard, p. 1. According to Kilgard, "bump mapping simulates a surface's irregular lighting appearance without the complexity and expense of modeling the patterns as true geometric perturbations to the surface." Kilgard, p. 1. Nevertheless, the computations required for original bump mapping techniques proposed by James Blinn in 1978 are considerably more expensive than those required for conventional hardware texture mapping. Kilgard at p. 2.

In view of the many attempts that have been made over the last two decades to reformulate bump mapping into a form suitable for hardware implementation, Kilgard proposes a new bump mapping technique. In short, Kilgard divides bump mapping into two steps. First, a perturbed surface normal is computed. Then, a lighting computation is performed using the perturbed surface normal. These two steps must be performed at each and every visible fragment of a bump-mapped surface. Kilgard.

Although Kilgard's new technique may be suitable for simulating surface irregularities (texture) representative of true geometric perturbations, it does not address the use of similar lighting effect to distinguish certain features of an object that are substantially indistinguishable in their natural environment.

SUMMARY OF THE INVENTION

The present invention meets the above needs and overcomes one or more deficiencies in the prior art by providing systems and methods for co-rendering multiple attributes in a three-dimensional data volume.

In one embodiment, the present invention includes a computer-implemented method for co-rendering multiple attributes in a three-dimensional data volume that comprises i) selecting a first attribute volume defined by a first attribute and a second attribute volume defined by a second attribute; ii) creating a three-dimensional sampling probe, wherein the sampling probe is a subvolume of the first attribute volume and the second attribute volume; iii) drawing at least a portion of an image of the sampling probe on a display device using a graphics card, the image comprising an intersection of the sampling probe, the first attribute volume and the second attribute volume; and iv) repeating the drawing step in response to movement of the sampling probe within each attribute volume so that as the sampling probe moves through each attribute volume, the image of the sampling probe is redrawn at a rate sufficiently fast to be perceived as moving in real-time.

In another embodiment, the present invention includes a computer readable medium for storing computer executable instructions for co-rendering multiple attributes in a three-dimensional data volume. The instructions are executable to implement i) selecting a first attribute volume defined by a first attribute and a second attribute volume defined by a second attribute; ii) creating a three-dimensional sampling probe, wherein the sampling probe is a subvolume of the first attribute volume and the second attribute volume; iii) drawing at least a portion of an image of the sampling probe on a display device using a graphics card, the image comprising an intersection of the sampling probe, the first attribute volume and the second attribute volume; and iv) repeating the drawing step in response to movement of the sampling probe within each attribute volume so that as the sampling probe moves through each attribute volume, the image of the sampling probe is redrawn at a rate sufficiently fast to be perceived as moving in real-time.

In another embodiment, the present invention includes a computer-implemented method for co-rendering multiple attributes in a three-dimensional data volume that comprises i) selecting a first attribute and a second attribute from multiple attributes, the first attribute the second attribute each having its own vertices; ii) creating a normal map using at least one of the first and second attributes, the normal map having its own vertices; iii) converting the normal map vertices and the vertices of the at least one of the first and second attributes used to create the normal map into a tangent space normal map; iv) calculating a diffused lighting component from the tangent space normal map and the at least one of the first and second attributes used to create the normal map; v) combining an ambient lighting component with the diffused lighting component and the first and second attributes using a graphics card to form an enhanced image comprising at least part of the first attribute and part of the second attribute; and vi) displaying at least a portion of the enhanced image to a user on a display device.

In yet another embodiment, the present invention includes a computer readable medium for storing computer executable instructions for co-rendering multiple attributes in a three-dimensional data volume. The instructions are executable to implement i) selecting a first attribute and a second attribute from multiple attributes, the first attribute the second attribute each having its own vertices; ii) creating a normal map using at least one of the first and second attributes, the normal map having its own vertices; iii) converting the normal map vertices and the vertices of the at least one of the first and second attributes used to create the normal map into a tangent space normal map; iv) calculating a diffused lighting component from the tangent space normal map and the at least one of the first and second attributes used to create the normal map; and v) combining an ambient lighting component with the diffused lighting component and the first and second attributes to form an enhanced image comprising at least part of the first attribute and part of the second attribute.

Additional aspects, advantages and embodiments of the invention will become apparent to those skilled in the art from the following description of the various embodiments and related drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention will be described with reference to the accompanying drawings, in which like elements are referenced with like reference numerals, and in which.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

The present invention may be implemented using hardware, software or a combination thereof, and may be implemented in a computer system or other processing system. The following description applies the present invention to various seismic data attributes which are contained within a specified space or volume referred to as a probe. Each probe comprises voxel data represented by x, y, z, data value. Each data value is associated with a particular seismic data attribute at a specified location (x, y, z). The present invention, therefore, may employ one or more of the hardware and software system components required to display and manipulate the probe as described in U.S. patent application Ser. No. 6,765,570 ("'570 Patent") assigned to Landmark Graphics Corporation and incorporated herein by reference. For a more complete description of the probe requirements, reference is made to the '570 Patent.

In addition to the probe requirements, the present invention may be implemented using current high performance graphics and personal computer commodity hardware in order to insure real time performance. Examples of available hardware for the personal computer include graphics cards like GeForce® marketed by NVIDIA® and 2.4 Ghz x86 instruction set computer processors manufactured by Intel® or AMD®.

Figure 1:
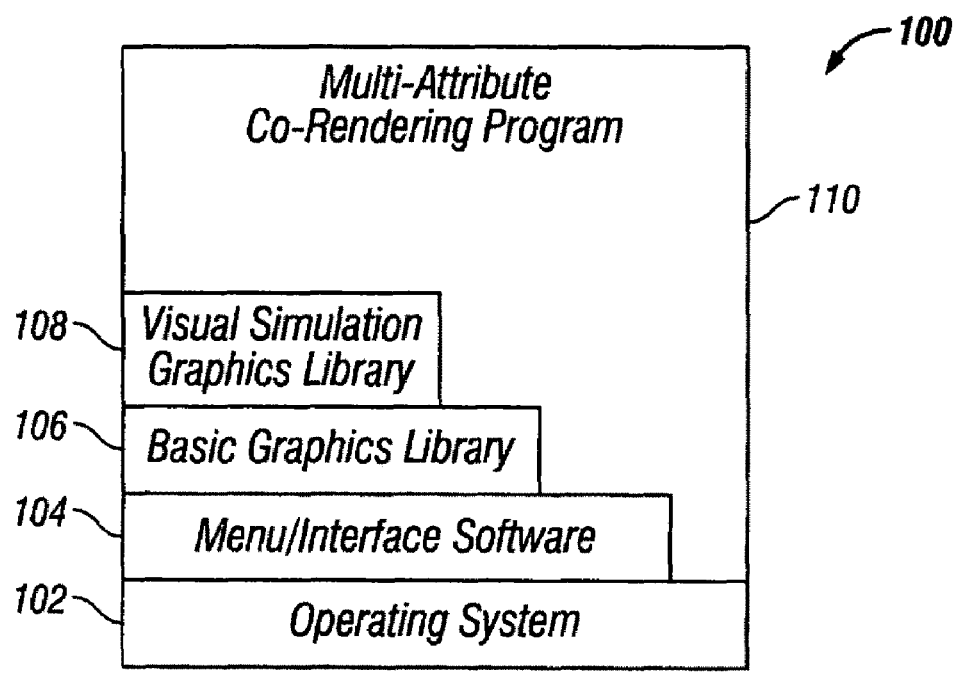
FIG. 1 is a block diagram illustrating one embodiment of a software program for implementing the present invention.

One embodiment of a software or program structure for implementing the present invention is shown in FIG. 1. At the base of program structure 100 is an operating system 102. Suitable operating systems may include, for example, UNIX® or Linux® operating systems, Windows NT®, and other operating systems generally known in the art.

Menu and interface software 104 overlays operating system 102. Menu and interface software 104 are used to provide various menus and windows to facilitate interaction with the user, and to obtain user input and instructions. Menu and interface software 104 may include, for example, Microsoft Windows®, X Free 86®, MOTIF®, and other menu and interface software generally known in the art.

A basic graphics library 106 overlays menu and interface software 104. Basic graphics library 106 is an application programming interface (API) for 3-D computer graphics. The functions performed by basic graphics library 106 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer.

A particularly useful basic graphics library 106 is OpenGL®, marketed by Silicon Graphics, Inc. ("SGI®"). The OpenGL® API is a multi-platform industry standard that is hardware, window, and operating system independent. OpenGL® is designed to be callable from C, C++, FORTRAN, Ada and Java programming languages. OpenGL® performs each of the functions listed above for basic graphics library 106. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), both of which are incorporated herein by reference.

Visual simulation graphics library 108 overlays the basic graphics library 106. Visual simulation graphics library 108 is an API for creating real-time, multi-processed 3-D visual simulation graphics applications. Visual simulation graphics library 108 provides functions that bundle together graphics library state control functions such as lighting, materials, texture, and transparency. These functions track state and the creation of display lists that can be rendered later.

A particularly useful visual simulation graphics library 108 is OpenGL Performer®, which is available from SGI®. OpenGL Performer® supports the OpenGL® graphics library discussed above. OpenGL Performer® includes two main libraries (libpf and libpr) and four associated libraries (libpfdu, libpfdb, libpfui, and libpfutil).

The basics of OpenGL Performer® is the performance rendering library libpr, a low-level library providing high speed rendering functions based on GeoSets and graphics state control using GeoStates. GeoSets are collections of drawable geometry that group same-type graphics primitives (e.g., triangles or quads) into one data object. The GeoSet contains no geometry itself, only pointers to data arrays and index arrays. Because all the primitives in a GeoSet are of the same type and have the same attributes, rendering of most databases is performed at a maximum hardware speed. GeoStates provide graphics state definitions (e.g., texture or material) for GeoSets.

Layered above libpr is libpf, a real-time visual simulation environment providing a high-performance multi-process database rendering system that optimizes use of multiprocessing hardware. The database utility library, libpfdu, provides functions for defining both geometric and appearance attributes of 3-D objects, shares states and materials, and generates triangle strips from independent polygonal input. The database library libpfdb uses the facilities of libpfdu, libpf and libpr to import database files in a number of industry standard database formats. The libpfui is a user interface library that provides building blocks for writing manipulation components for user interfaces (C and C++ programming languages). Finally, the libpfutil is the utility library that provides routines for implementing tasks and graphical user interface (GUI) tools.

An application program which uses OpenGL Performer® and OpenGL® API typically performs the following steps in preparing for real-time 3-D visual simulation:
1. Initialize OpenGL Performer®;
2. Specify number of graphics pipelines, choose the multiprocessing configuration, and specify hardware mode as needed;
3. Initialize chosen multiprocessing mode;
4. Initialize frame rate and set frame-extend policy;
5. Create, configure, and open windows as required; and
6. Create and configure display channels as required.

Once the application program has created a graphical rendering environment by carrying out steps 1 through 6 above, then the application program typically iterates through the following main simulation loop once per frame:
1. Compute dynamics, update model matrices, etc.;
2. Delay until the next frame time;
3. Perform latency critical viewpoint updates; and
4. Draw a frame.

Alternatively, Open Scene Graph® can be used as the visual simulation graphics library 108. Open Scene Graph® operates in the same manner as OpenGL Performer®, providing programming tools written in C/C++ for a large variety of computer platforms. Open Scene Graph® is based on OpenGL® and is publicly available.

A multi-attribute co-rendering program 110 of the present invention overlays visual simulation graphics library 108. In a manner generally well known in the art, program 110 interfaces with, and utilizes the functions carried out by, the probe described in the '570 Patent, which interfaces with, and utilizes the functions carried out by, the visual simulation graphics library 108, basic graphics library 106, menu and interface software 104 and the operating system 102. Program 110 is preferably written in an object oriented programming language to allow the creation and use of objects and object functionality. One preferred object oriented programming language is C++.

In this particular embodiment, program 110 stores the 3-D volume data set in a manner generally well known in the art. For example, the format for a particular data volume may include two parts: a volume header followed by the body of data that is as long as the size of the data set. The volume header typically includes information in a prescribed sequence, such as the file path (location) of the data set, size, dimensions in the x, y, and z directions, annotations for the x, y and z axes, annotations for the data value, etc. The body of data is a binary sequence of bytes and may include one or more bytes per data value. For example, the first byte is the data value at volume location (0,0,0); the second byte is the data value at volume location (1,0,0); and the third byte is the data value at volume location (2,0,0). When the x dimension is exhausted, then the y dimension and the z dimension are incremented, respectively. This embodiment is not limited in any way to a particular data format.

The program 110 facilitates input from a user to identify one or more 3-D volume data sets to use for imaging and analysis. When a plurality of data volumes is used, the data value for each of the plurality of data volumes represents a different physical parameter or attribute for the same geographic space. By way of example, a plurality of data volumes could include a geology volume, a temperature volume, and a water-saturation volume. The voxels in the geology volume can be expressed in the form (x, y, z, seismic amplitude). The voxels in the temperature volume can be expressed in the form (x, y, z, ° C.). The voxels in the water-saturation volume can be expressed in the form (x, y, z, % saturation). The physical or geographic space defined by the voxels in each of these volumes is the same. However, for any specific spatial location $(x_0, y_0, z_0)$, the seismic amplitude would be contained in the geology volume, the temperature in the temperature volume, and the water-saturation in the water-saturation volume. The operation of program 110 is described in reference to FIGS. 2 through 8.

Figure 2:
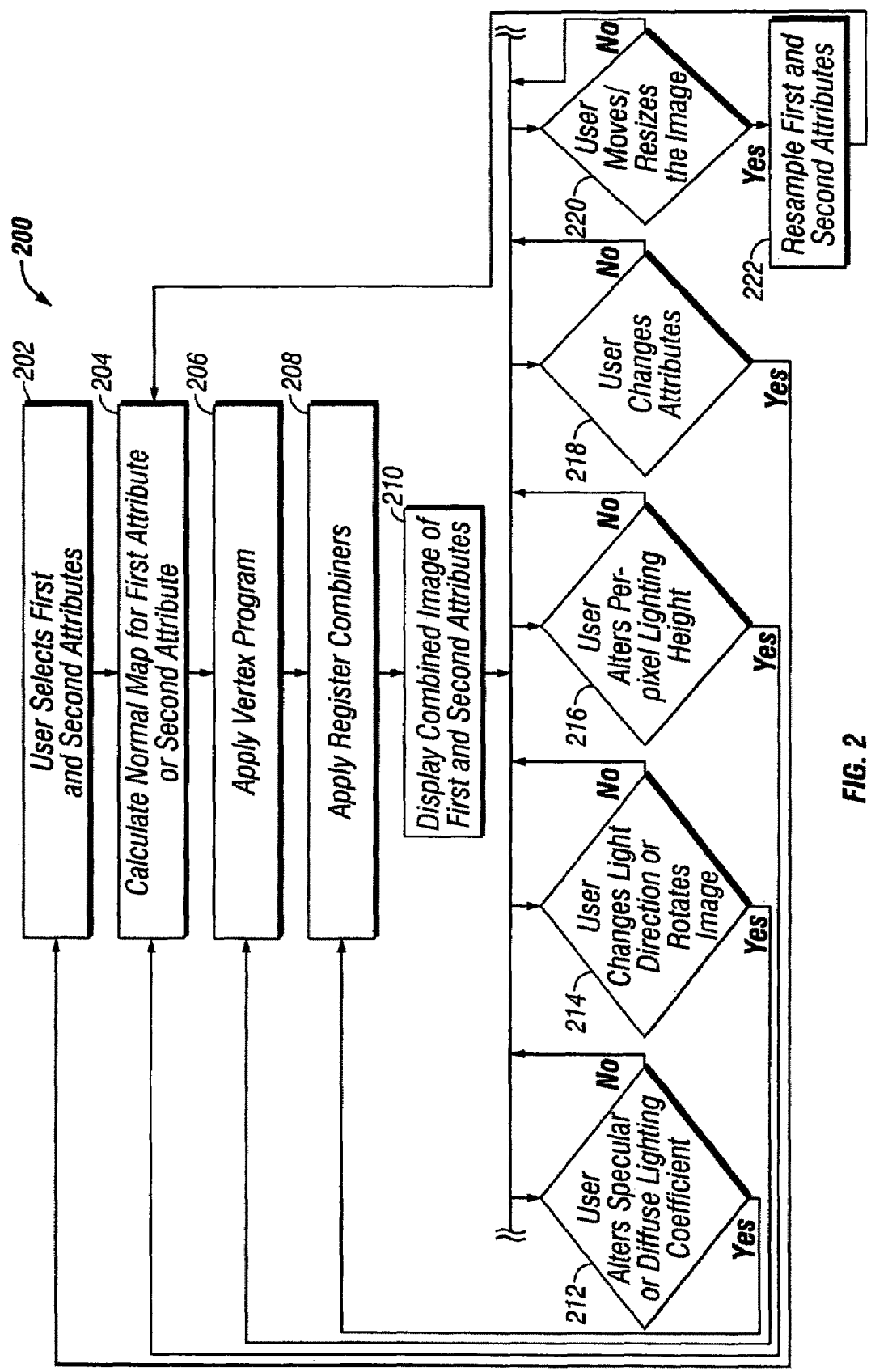
FIG. 2 is a flow diagram illustrating one embodiment of a method for implementing the present invention.

Referring now to FIG. 2, a method 200 is illustrated for co-rendering multiple attributes in a combined image. The following description refers to certain bump mapping algorithms and techniques discussed in Kilgard.

In step 202, a first attribute and a second attribute are selected from the available attributes using the GUI tools (menu/interface software 104) described in reference to FIG. 1. Although other available stored attributes may be used, such as frequency and phase, semblance is used as the first attribute illustrated in the probe 300 of FIG. 3, and amplitude is used as the second attribute illustrated in the probe 400 of FIG. 4. The seismic data is displayed on the visible planar surfaces of the probe using conventional shading/opacity (texture mapping) techniques, however, may be displayed within the planar surfaces defining the probe using volume rendering techniques generally well known in the art. In order to display seismic data in the manner thus described, voxel data is read from memory and converted into a specified color representing a specific texture. Textures are tiled into 256 pixel by 256 pixel images. For large volumes, many tiles exist on a single planar surface of the probe. This process is commonly referred to by those skilled in the art as sampling, and is coordinated among multiple CPU's on a per-tile basis. These techniques, and others employed herein, are further described and illustrated in the '570 Patent.

In step 204, a normal map is calculated in order to convert the texture based semblance attribute illustrated in FIG. 3, sometimes referred to as a height field, into a normal map that encodes lighting information that will be used later by the register combiners. This technique enables the application of per-pixel lighting to volumetric data in the same way the probe displays volumetric data. In other words, it is a 2-D object which is actually displayed, however, because it is comprised of voxel data and the speed at which it is displayed, appears as a 3-D object. In short, this step converts the data values representing the semblance attribute into perturbed normalized vectors that are used by the graphics card to calculate lighting effects which give the illusion of depth and geometry when, in fact, a planar surface is displayed.

The normal map comprises multiple perturbed normal vectors which, collectively, are used to construct an illusion of height, depth and geometry on a planar surface. Each perturbed normal vector is derived from the cross product of the vertical and horizontal components for each data value on a given surface (e.g., 310) in FIG. 3. Each perturbed normal vector is stored in the hardware as a texture unit (normal map) wherein each spatial coordinate (x, y, z) for each perturbed normal vector is assigned a specified color red, green or blue (RGB) value. The coordinate space in which these coordinates are assigned RGB values is generally known as texture coordinate space. Thus, the blue component of the perturbed normal vector represents the spatial coordinate (z). A pixel in the texture that is all blue would therefore, represent a typical tangent vector in planar objects such as the surface 310 in FIG. 3. As the data values vary, the normal map appearance becomes less blue and appears almost chalky. The techniques necessary to derive a normal map from a height field are generally described in Section 5.3 of Kilgard. By applying the equations referred to in Section 2.6 of Kilgard to the data values shown in the probe 300 of FIG. 3, a normal map may be constructed. One set of instructions to perform this method and technique is illustrated in Appendix E of Kilgard.

Figure 3:
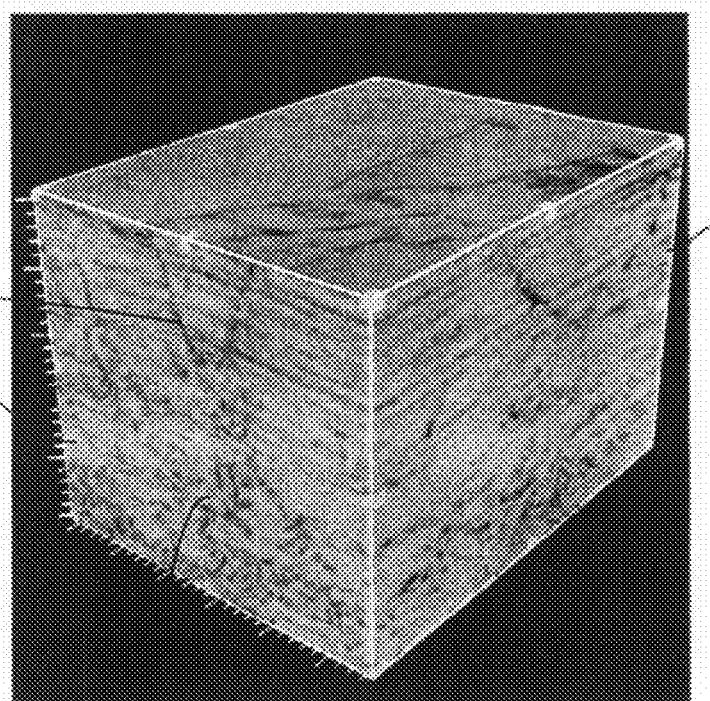
FIG. 3 is a color drawing illustrating semblance as a seismic data attribute.

In order to obtain a more accurate lighting effect, a vertex program is applied in step 206 to the vertices that constrain the planar surface 310 of the underlying attribute illustrated in FIG. 3 and the vertices that constrain the corresponding planar surface of the normal map (not shown). A new coordinate space, tangent space, is contained in a transformation matrix used by the vertex program. The programmable hardware on the graphics card is used for rendering coordinate space transforms that drive the vertex program. The tangent space is constructed on a per-vertex basis, and typically requires the CPU to supply per-vertex light-angle vectors and half-angle vectors as 3-D texture coordinates. The light angle vectors and half angle vectors are likewise converted to tangent space when multiplied by the tangent space matrix. This step employs the techniques generally described in Section 5.1 of Kilgard.

For example, normal and tangent vectors are calculated on a per-vertex basis for a given geometric model—like the probe 300 in FIG. 3. A bi-normal vector is calculated by taking the cross product of the tangent and normal vector components for each vertex. The tangent, normal and bi-normal vectors thus, form an ortho-normal basis at each vertex. The ortho-normal basis represents a matrix used to transform objects, space, light and eye position into tangent space. One set of instructions for performing this technique is illustrated in Appendix C of Kilgard.

Figure 4:
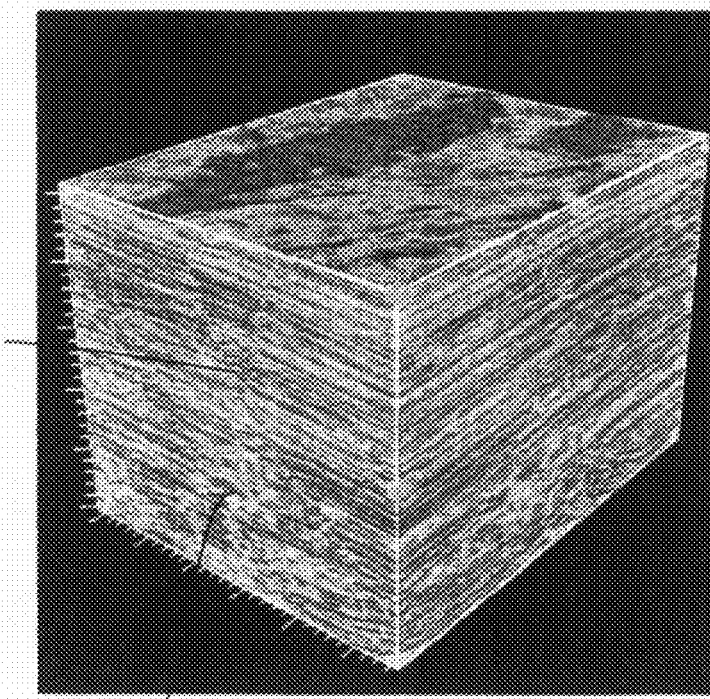
FIG. 4 is a color drawing illustrating amplitude as a seismic data attribute.

Register combiners or texture shaders (not shown) are applied by the graphics card in step 208 to calculate the lighting equations described in Sections 2.5 through 2.5.1 of Kilgard. The GeForce® and Quadro® register combiners, available through NVIDIA®, provide a configurable, but not programmable, means to determine per-pixel fragment coloring/shading, and replace the standard OpenGL® fixed function texture environment, color sum, and fog operations with an enhanced mechanism for coloring/shading fragments. With multi-textured OpenGL®, filtered texels from each texture unit representing the normal map and the second attribute (amplitude) illustrated in the probe 400 of FIG. 4 are combined with the fragments' current color in sequential order. The register combiners are generally described in Section 4.2 of Kilgard as a sequential application of general combiner stages that culminate in a final combiner stage that outputs an RGBA color for the fragment. One set of instructions for programming OpenGL® register combiners is illustrated in Appendix B of Kilgard.

As further explained in Section 5.4 of Kilgard, the register combiners are configured to compute the ambient and diffuse illumination for the co-rendered image that is displayed in step 210 by means generally well-known in the art. In short, the register combiners are used to calculate ambient and diffuse lighting effects (illumination) for the normal map, after the vertex program is applied, and the second attribute which are combined to form an enhanced image representing the first and second attributes. The resulting data values for the combined image represent a blended texture or combined texture of both the first and second attributes. One set of instructions for programming the register combiners to compute the ambient and diffuse illumination is illustrated in Appendix G of Kilgard.

Alternatively, fragment routines, generally well known in the art, may be used with the register combiners to provide a more refined per-pixel lighting effect for the normal map.

As illustrated in FIG. 3, certain geological features, such as faults represented by the black color values 312, are distinguished from the blue color values 314 due to discontinuity between the adjacent data values measured along the z-axis. In FIG. 4, the same geological features 412 are barely distinguishable because they are illustrated by a different attribute (amplitude) that is assigned multiple color values and contains more consistent adjacent data values along the z-axis. The same geological features 512 are even more readily distinguished in FIG. 5 due to the enhanced surface texture which appears to give the planar surface 510 on the probe 500 depth and height.

Figure 5:
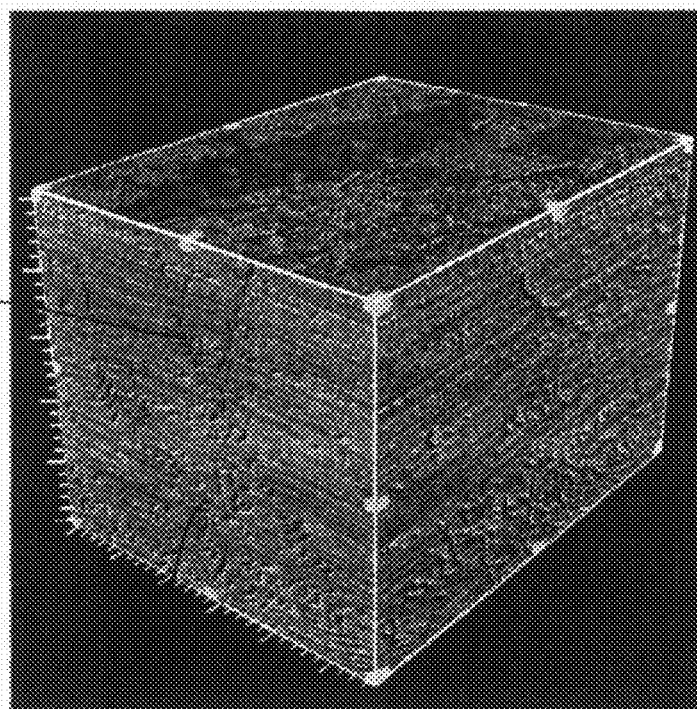
FIG. 5 is a color drawing illustrating the combined image of both attributes illustrated in FIGS. 3 and 4.

In FIG. 5, the first attribute (semblance) is distinguished by shading from the second attribute (amplitude) which is shown by various color values. This illusion is uncharacteristic of the actual geological feature which is substantially indistinguishable in its natural environment. Although both attributes are not visible at the same time over the planar surface 510 of the probe 500, they are imaged in the same space and capable of being simultaneously viewed depending on the angle of the probe 500 relative to the light source. Thus, as the probe 500 is rotated, certain voxels representing the first attribute become masked while others representing the second attribute become visible, and vice-versa. This technique is useful for enhancing images of certain features of an object which are substantially indistinguishable in their natural environment. The present invention may also be applied, using the same techniques, to image volume-rendered seismic-data attributes.

As the image is displayed in step 210, several options described in reference to steps 212 through 220 may be interactively controlled through the menu/interface software 104 to compare and analyze any differences between the various images.

In step 212, the specular or diffuse lighting coefficients may be interactively controlled to alter the shading/lighting effects applied to the combined image. Accordingly, the register combiners are reapplied in step 208 to enhance the image displayed in step 210.

Figure 6:
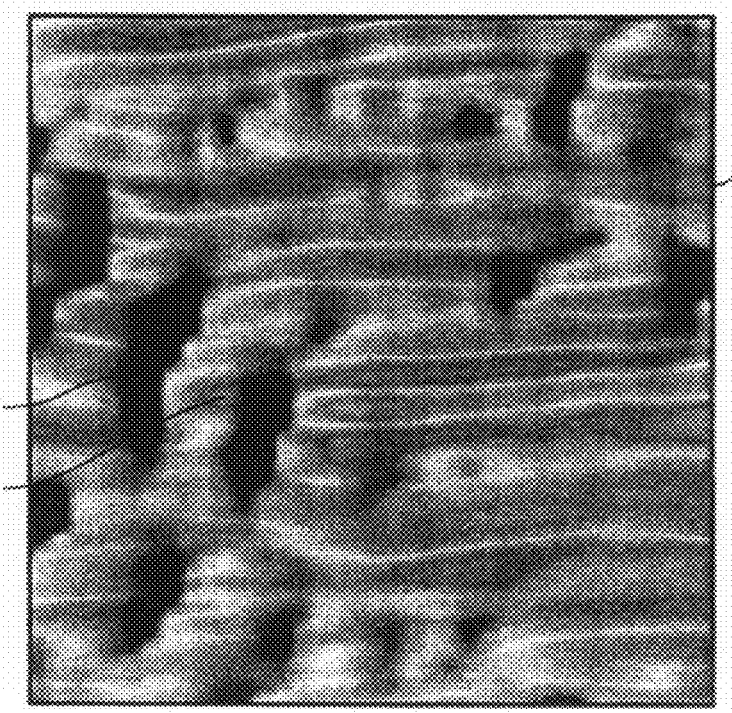
FIG. 6 is a color drawing illustrating the combined image of FIG. 5 with the light source positioned to the left of the image.
Figure 7:
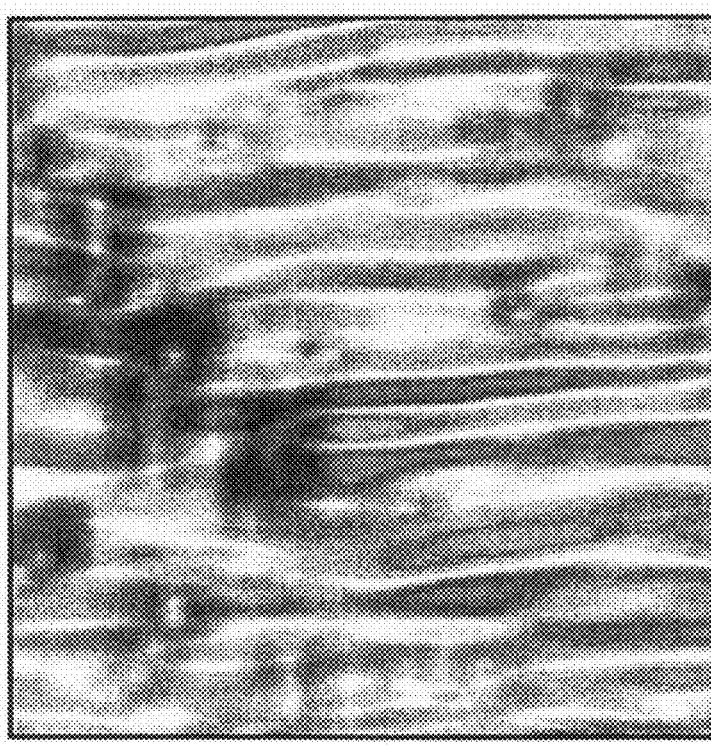
FIG. 7 is a color drawing illustrating the combined image of FIG. 5 with the light source positioned perpendicular to the image.
Figure 8:
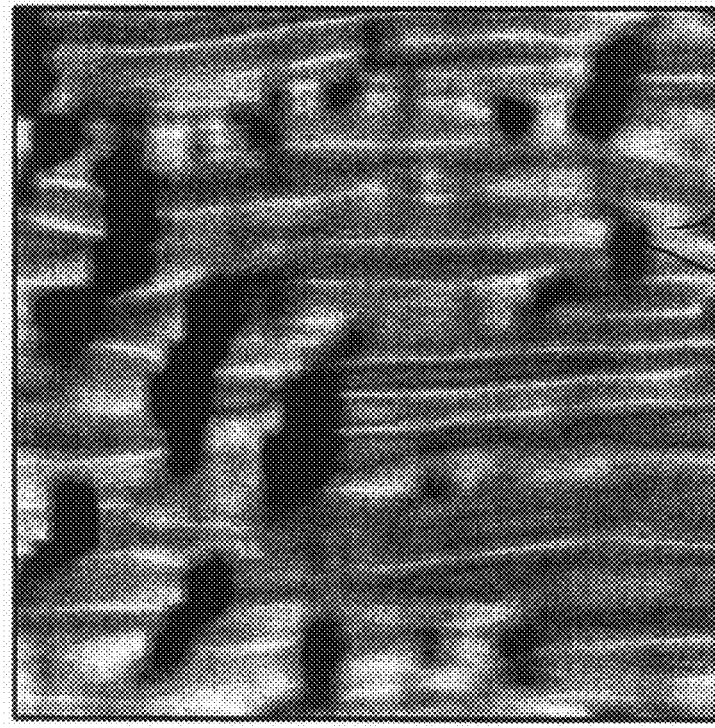
FIG. 8 is a color drawing illustrating the combined image of FIG. 5 with the light source positioned to the right of the image.

In step 214, the imaginary light source may be interactively repositioned or the probe may be interactively rotated to image other geological features revealed by the attributes. The movement of the probe is accomplished by means generally described in the '570 Patent except that the graphics card is programmed to draw the probe. In FIGS. 6-8, the planar surface 510 of the probe 500 illustrated in FIG. 5 is fixed at a position perpendicular to the line of sight as the light source is interactively repositioned. As the light source moves, different voxels become illuminated according to the position of the light source. The effect is similar to that achieved when the probe is rotated. Accordingly, steps 206 and 208 are reapplied to provide different perspectives of the image displayed in step 210.

In FIG. 6, for example, the light source is positioned to the left of the probe face 610 so that voxels 612, which are perceived as indentions, appear darker while voxels 614, which are perceived as bumps, appear lighter or more illuminated. When the light source is repositioned to the right of the probe face 810, as in FIG. 8, different voxels 812, 814 appear darker and lighter than those illustrated in FIG. 6. As illustrated in FIG. 7, the light source is positioned perpendicular to the probe face 710 and the entire image appears brighter. This effect is attributed to the specular component of the lighting equation, and enhances the illusion of depth and height in the image as the light source is repositioned or the probe is rotated. One set of instructions explaining how to configure the register combiners to compute the specular component is illustrated in Appendix H of Kilgard. In this manner, the combined image can be interactively manipulated to simultaneously reveal multiple attributes with nominal loss in the clarity of each attribute.

In step 216, the per-pixel lighting height is interactively controlled to alter the normal depth of the indentions and/or height of the bumps which are shaded and illuminated as described in reference to step 208. The per-pixel lighting height is interactively controlled by scaling each perturbed normal vector from zero which cancels any indentations or bumps. If the per-pixel lighting is scaled in positive increments, then each perturbed normal vector height (bump) or depth (indentation) is increased. Conversely, if the per-pixel lighting is scaled in negative increments, then each perturbed normal vector height or depth is decreased. The net effect produces an image that appears to alter the position of the light source so that different features of the object are enhanced. Accordingly, steps 204, 206, and 208 are reapplied to provide different perspectives of the image displayed in step 210.

In step 218, different attributes are interactively selected in the manner described in reference to step 202. Accordingly, steps 204, 206, and 208 are reapplied to provide an entirely new image, illustrating different data values in step 210. Furthermore, the image displayed in step 210 may illustrate more than two attributes which are selected in step 218. For example, if the available attributes include amplitude, phase and semblance, then a normal map is created for any two of these attributes in the manner described in reference to step 204. In other words, a normal map is calculated or each of the two selected attributes and the resulting value for each perturbed normal vector in one normal map is then added to the value of each perturbed normal vector in the other normal map, at the same location, to create a single normal map that is used in the manner described in reference to steps 206 and 208. Alternatively, the voxels for one of the selected attributes can be added to the voxels of the other selected attribute at the same location and a normal map is calculated for the combined voxel values in the manner described in reference to step 204. The normal map is then used in the manner described in reference to steps 206 and 208. In either application where there are more than two attributes, one attribute will serve as the static attribute until step 208, while the others will be used in the manner thus described.

In step 220, the probe is interactively controlled so that it can be resized or moved in a manner more particularly described in the '570 Patent. This step necessarily alters the voxels displayed on the planar surfaces of the probe for the combined image displayed in step 210. As a result, the first and second attributes must be re-sampled in step 222 and steps 204, 206, and 208 must be reapplied to display a new image in step 210 illustrating the same attributes at a different location.

The techniques described by the foregoing invention remove the extra processing step normally encountered in conventional bump mapping techniques by interactively processing the attributes using hardware graphics routines provided by commodity PC graphics cards. These techniques are therefore, particularly useful to the discovery and development of energy resources.

While the present invention has been described in connection with presently preferred embodiments, it will be understood by those skilled in the art that it is not intended to limit the invention to those embodiments. The present invention, for example, may be applied to other types of data according to the methods described herein. It is therefore, contemplated that various alternative embodiments and modifications may be made to the disclosed embodiments without departing from the spirit and scope of the invention defined by the appended claims and equivalents

The invention claimed is:

1. A computer-implemented method for co-rendering multiple attributes in a three-dimensional data volume, which comprises:
   selecting a first attribute volume defined by a first attribute and a second attribute volume defined by a second attribute;
   creating a three-dimensional sampling probe, wherein the sampling probe is a subvolume of the first attribute volume and the second attribute volume;
   drawing at least a portion of an image of the sampling probe on a display device using a graphics card, the image comprising an intersection of the sampling probe, the first attribute volume and the second attribute volume; and
   repeating the drawing step in response to movement of the sampling probe within each attribute volume so that as the sampling probe moves through each attribute volume, the image of the sampling probe is redrawn at a rate sufficiently fast to be perceived as moving in real-time.

2. The method of claim 1, wherein the image of the sampling probe forms a combined image of a portion of the first attribute volume and a portion of the second attribute volume.

3. The method of claim 2, wherein the combined image comprises data values representing a combined texture of a portion of the first attribute and a portion of the second attribute.

4. The method of claim 1, wherein the image of the sampling probe comprises only an intersection of the sampling probe, the first attribute volume and the second attribute volume.

5. The method of claim 4, wherein the drawing step comprises:
   extracting a first subvolume data set from the first attribute volume corresponding to a surface of the sampling probe;
   extracting a second subvolume data set from the second attribute volume corresponding to a surface of the sampling probe;
   creating a normal map using at least one of the first subvolume data set and the second subvolume data set, the normal map having its own vertices;
   converting the normal map vertices and vertices of the at least one of the first subvolume data set and the second subvolume data set used to create the normal map into a tangent space normal map;
   calculating a diffuse lighting component from the tangent space normal map and the at least one of the first subvolume data set and the second subvolume data set used to create the normal map;
   combining an ambient lighting component with the diffuse lighting component and the first subvolume data set and the second subvolume data set to form an enhanced image of the first subvolume data set and the second subvolume data set;
   texture mapping the enhanced image onto the surface of the sampling probe; and
   displaying at least a portion of the enhanced image, the portion of the displayed enhanced image comprising at least part of the first subvolume data set and part of the second subvolume data set.

6. The method of claim 5, wherein the first attribute is represented by a plurality of data values and the second attribute is represented by another plurality of data values, the enhanced image representing a combined texture of the first attribute and the second attribute.

7. The method of claim 4, wherein the drawing step comprises:
   extracting a first subvolume data set from the first attribute volume corresponding to a surface of the sampling probe;
   extracting a second subvolume data set from the second attribute volume corresponding to a surface of the sampling probe;
   combining an image of the first subvolume data set and the second subvolume data set; and
   texture mapping the combined image onto the surface of the sampling probe.

8. The method of claim 4, wherein the first attribute volume and the second attribute volume are each defined by a data set of voxels, each voxel being expressed in the form of x, y, z, data value.

9. The method of claim 8, wherein the sampling probe is a transparent cut probe and the first attribute volume and the second attribute volume each comprise a visible data set of voxels.

10. The method of claim 1, wherein the image of the sampling probe is redrawn at a frame rate of at least 12 frames per second.

11. The method of claim 1, wherein the sampling probe is a data probe and the first attribute volume and the second attribute volume are transparent.

12. A computer readable medium for storing computer executable instructions for co-rendering multiple attributes in a three-dimensional data volume, the instructions being executable to implement:
    selecting a first attribute volume defined by a first attribute and a second attribute volume defined by a second attribute;
    creating a three-dimensional sampling probe, wherein the sampling probe is a subvolume of the first attribute volume and the second attribute volume;
    drawing at least a portion of an image of the sampling probe on a display device using a graphics card, the image comprising an intersection of the sampling probe, the first attribute volume and the second attribute volume; and
    repeating the drawing step in response to movement of the sampling probe within each attribute volume so that as the sampling probe moves through each attribute volume, the image of the sampling probe is redrawn at a rate sufficiently fast to be perceived as moving in real-time.

13. The computer readable medium of claim 12, wherein the image of the sampling probe forms a combined image of a portion of the first attribute volume and a portion of the second attribute volume.

14. The computer readable medium of claim 13, wherein the combined image comprises data values representing a combined texture of a portion of the first attribute and a portion of the second attribute.

15. The computer readable medium of claim 12, wherein the image of the sampling probe comprises only an intersection of the sampling probe, the first attribute volume and the second attribute volume.

16. The computer readable medium of claim 15, wherein the drawing step comprises:
    extracting a first subvolume data set from the first attribute volume corresponding to a surface of the sampling probe;
    extracting a second subvolume data set from the second attribute volume corresponding to a surface of the sampling probe;
    creating a normal map using at least one of the first subvolume data set and the second subvolume data set, the normal map having its own vertices;
    converting the normal map vertices and vertices of the at least one of the first subvolume data set and the second subvolume data set used to create the normal map into a tangent space normal map;
    calculating a diffuse lighting component from the tangent space normal map and the at least one of the first subvolume data set and the second subvolume data set used to create the normal map;
    combining an ambient lighting component with the diffuse lighting component and the first subvolume data set and the second subvolume data set to form an enhanced image of the first subvolume data set and the second subvolume data set;
    texture mapping the enhanced image onto the surface of the sampling probe; and
    displaying at least a portion of the enhanced image, the portion of the displayed enhanced image comprising at least part of the first subvolume data set and part of the second subvolume data set.

17. The computer readable medium of claim 16, wherein the first attribute is represented by a plurality of data values and the second attribute is represented by another plurality of data values, the enhanced image representing a combined texture of the first attribute and the second attribute.

18. The computer readable medium of claim 15, wherein the drawing step comprises:
    extracting a first subvolume data set from the first attribute volume corresponding to a surface of the sampling probe;
    extracting a second subvolume data set from the second attribute volume corresponding to a surface of the sampling probe;
    combining an image of the first subvolume data set and the second subvolume data set; and
    texture mapping the combined image onto the surface of the sampling probe.

19. The computer readable medium of claim 15, wherein the first attribute volume and the second attribute volume are each defined by a data set of voxels, each voxel being expressed in the form of x, y, z, data value.

20. The computer readable medium of claim 19, wherein the sampling probe is a transparent cut probe and the first attribute volume and the second attribute volume each comprise a visible data set of voxels.

21. The computer readable medium of claim 12, wherein the image of the sampling probe is redrawn at a frame rate of at least 12 frames per second.

22. The computer readable medium of claim 12, wherein the sampling probe is a data probe and the first attribute volume and the second attribute volume are transparent.

23. A computer-implemented method for co-rendering multiple attributes in a three-dimensional data volume, which comprises:
    selecting a first attribute and a second attribute from multiple attributes, the first attribute and the second attribute each having its own vertices;
    creating a normal map using at least one of the first and second attributes, the normal map having its own vertices;

converting the normal map vertices and the vertices of the at least one of the first and second attributes used to create the normal map into a tangent space normal map;

calculating a diffuse lighting component from the tangent space normal map and the at least one of the first and second attributes used to create the normal map; and combining an ambient lighting component with the diffuse lighting component and the first and second attributes using a graphics card to form an enhanced image comprising at least part of the first attribute and part of the second attribute; and displaying at least a portion of the enhanced image to a user on a display device.

24. The method of claim 23, wherein the enhanced image displayed is displayed on at least a portion of one of a plurality of planar surfaces defining a probe.

25. The method of claim 23, wherein the enhanced image displayed is displayed at least partially within a plurality of planar surfaces defining a probe.

26. The method of claim 23, wherein the first attribute and the second attribute each comprise multiple data values and associated spatial coordinates, each data value having a three-dimensional spatial coordinate.

27. The method of claim 26, wherein the normal map comprises multiple perturbed normal vectors that are derived from the cross product of a vertical component and a horizontal component for each data value.

28. The method of claim 23, wherein a vertex program is used to convert the normal map vertices and the vertices of the at least one of the first and second attributes used to create the normal map into the matrix representing the tangent space normal map.

29. The method of claim 23, wherein the diffuse lighting component and the ambient lighting component are each calculated using a register combiner.

30. The method of claim 29, wherein the ambient lighting component, the diffuse lighting component and the first and second attributes are combined using the register combiners to form the enhanced image.

31. The method of claim 23, wherein the ambient lighting component is a predetermined constant.

32. The method of claim 23, further comprising the steps of:

calculating a specular lighting component from the tangent space normal map and the at least one of the first and second attributes used to create the normal map; and combining the specular lighting component, the ambient lighting component, the diffuse lighting component and the first and second attributes to form the enhanced image.

33. The method of claim 23, further comprising the steps of:

applying an imaginary light source to the enhanced image;

displaying a portion of the enhanced image to a user;

interactively repositioning at least one of the imaginary light source and the displayed enhanced image relative to a line of sight of the displayed enhanced image to the user; and repeating the converting, calculating and combining steps in claim 23.

34. A computer readable medium for storing computer executable instructions for co-rendering multiple attributes in a three-dimensional data volume, the instructions being executable to implement:

selecting a first attribute and a second attribute from multiple attributes, the first attribute and the second attribute each having its own vertices;

creating a normal map derived from at least one of the first and second attributes, the normal map having its own vertices;

converting the normal map vertices and the vertices of the at least one of the first and second attributes used to create the normal map into a tangent space normal map;

calculating a diffuse lighting component from the tangent space normal map and the at least one of the first and second attributes used to create the normal map; and combining an ambient lighting component with the diffuse lighting component and the first and second attributes to form an enhanced image comprising at least part of the first attribute and part of the second attribute.

35. The computer readable medium of claim 34, further comprising the step of displaying at least a portion of the enhanced image to a user.

36. The computer readable medium of claim 35, wherein the enhanced image displayed is displayed on at least a portion of one of a plurality of planar surfaces defining a probe.

37. The computer readable medium of claim 35, wherein the enhanced image displayed is displayed at least partially within a plurality of planar surfaces defining a probe.

38. The computer readable medium of claim 34, wherein the first attribute and the second attribute each comprise multiple data values and corresponding spatial coordinates, each data value having a three-dimensional spatial coordinate.

39. The computer readable medium of claim 38, wherein the normal map comprises multiple perturbed normal vectors that are derived from the cross product of a vertical component and a horizontal component for each data value.

40. The computer readable medium of claim 34, wherein a vertex program is used to convert the normal map vertices and the vertices of the at least one of the first and second attributes used to create the normal map into the matrix representing the tangent space normal map.

41. The computer readable medium of claim 34, wherein the diffuse lighting component and the ambient lighting component are each calculated using a register combiner.

42. The computer readable medium of claim 41, wherein the ambient lighting component, the diffuse lighting component and the first and second attributes are combined using the register combiners to form the enhanced image.

43. The computer readable medium of claim 34, wherein the ambient lighting component is a predetermined constant.

44. The computer readable medium of claim 34, further comprising the steps of:

calculating a specular lighting component from the tangent space normal map and the at least one of the first and second attributes used to create the normal map; and combining the specular lighting component, the ambient lighting component, the diffuse lighting component and the first and second attributes to form the enhanced image.

45. The computer readable medium of claim 34, further comprising the steps of:

applying an imaginary light source to the enhanced image;

displaying a portion of the enhanced image to a user;

interactively repositioning at least one of the imaginary light source and the displayed enhanced image relative to a line of sight of the displayed enhanced image to the user; and repeating the converting, calculating and combining steps in claim 34.

* * * * *

UNITED STATES PATENT AND TRADEMARK OFFICE
CERTIFICATE OF CORRECTION

PATENT NO.       : 7,616,213 B2
APPLICATION NO.  : 11/904141
DATED            : November 10, 2009
INVENTOR(S)      : Christopher John Chuter It is certified that error appears in the above-identified patent and that said Letters Patent is hereby corrected as shown below:

Title Page item 56 "U.S. Patent No. 4,359,766, 11/1982 Waters et al.", incorrectly appears in the "References Cited" section. The correct patent number is "U.S. Patent No. 6,138,075, 11/1982 Waters et al."

Column 2, lines 33-34 should read: "U.S. Patent No. 6,690,820, assigned to assigned to Landmark Graphics Corporation" instead of "U.S. patent application Ser. No. 09/936,780, assigned to Magic Earth, inc."

Column 2, line 41 should read "value" instead of "vale"

Column 12, line 40 should read "corresponding to the surface" instead of "corresponding to a surface"

Column 13, line 9 should read "corresponding to the surface" instead of "corresponding to a surface"

Column 14, line 2 should read "corresponding to the surface" instead of "corresponding to a surface"

Column 14, line 38 should read "corresponding to the surface" instead of "corresponding to a surface"

Signed and Sealed this
Seventh Day of February, 2012

David J. Kappos
*Director of the United States Patent and Trademark Office*